(12) United States Patent
McAdam

(10) Patent No.: US 7,571,552 B2
(45) Date of Patent: Aug. 11, 2009

(54) SCALE READING APPARATUS

(75) Inventor: Simon Eliot McAdam, Bristol (GB)

(73) Assignee: Renishaw PLC, Wotton-Under-Edge (GB)

( * ) Notice: Subject to any disclaimer, the term of this patent is extended or adjusted under 35 U.S.C. 154(b) by 35 days.

(21) Appl. No.: 11/629,854

(22) PCT Filed: Jul. 6, 2005

(86) PCT No.: PCT/GB2005/002652

§ 371 (c)(1),
(2), (4) Date: Dec. 18, 2006

(87) PCT Pub. No.: WO2006/003452

PCT Pub. Date: Jan. 12, 2006

(65) Prior Publication Data

US 2007/0256313 A1 Nov. 8, 2007

(30) Foreign Application Priority Data

Jul. 6, 2004 (GB) ................... 0415141.1

(51) Int. Cl.
*G01D 5/347* (2006.01)
(52) U.S. Cl. ............................ 33/706; 33/1 PT; 341/51
(58) Field of Classification Search ................ 33/1 PT, 33/706, 707, 708; 341/51
See application file for complete search history.

(56) References Cited

U.S. PATENT DOCUMENTS

| 4,414,754 A | * | 11/1983 | Lapeyre ...................... 33/707 |
| 4,449,191 A | * | 5/1984 | Mehnert ...................... 33/1 PT |
| 4,459,750 A | * | 7/1984 | Affa ............................ 33/707 |
| 4,477,920 A |  | 10/1984 | Nygaard, Jr. |
| 4,483,077 A | * | 11/1984 | Matsumoto et al. ........... 33/707 |
| 4,616,131 A |  | 10/1986 | Burkhardt |
| 5,115,573 A | * | 5/1992 | Rieder et al. ................... 33/706 |
| 5,129,725 A | * | 7/1992 | Ishizuka et al. ................ 33/707 |
| 5,252,825 A |  | 10/1993 | Imai et al. |
| 5,332,895 A |  | 7/1994 | Rieder et al. |
| 5,687,103 A |  | 11/1997 | Hagl et al. |
| 5,793,201 A |  | 8/1998 | Nelle et al. |
| 5,978,418 A |  | 11/1999 | Greve et al. |
| 6,922,899 B2 | * | 8/2005 | Nakamura et al. ........... 33/1 PT |
| 7,421,800 B2 | * | 9/2008 | Howley ........................ 33/706 |

FOREIGN PATENT DOCUMENTS

| CN | Y-2450637 | 9/2001 |
| DE | 34 09 544 A1 | 9/1985 |
| EP | 0 171 579 A1 | 2/1986 |
| EP | 0 207 121 B1 | 1/1987 |
| EP | 0 612 979 A1 | 8/1994 |
| EP | 0 947 805 A2 | 10/1999 |
| WO | WO-03/058172 | 7/2003 |

* cited by examiner

*Primary Examiner*—G. Bradley Bennett
(74) *Attorney, Agent, or Firm*—Oliff & Berridge PLC

(57) ABSTRACT

Scale reading apparatus having a scale and readhead moveable relative to one another. The scale has a first incremental scale pattern with a fine pitch and a second incremental scale pattern with a coarse pitch. The readhead has a detector to detect each of the incremental scale patterns. The scale reading apparatus can be used for both slow speed and fast speed measurements. The second incremental scale pattern may be provided in a scale track which has a dual function (e.g. limit track or reference mark) and the readhead may be configured to decode the signal to produce an output suitable for the desired function.

40 Claims, 10 Drawing Sheets

Figure 1:
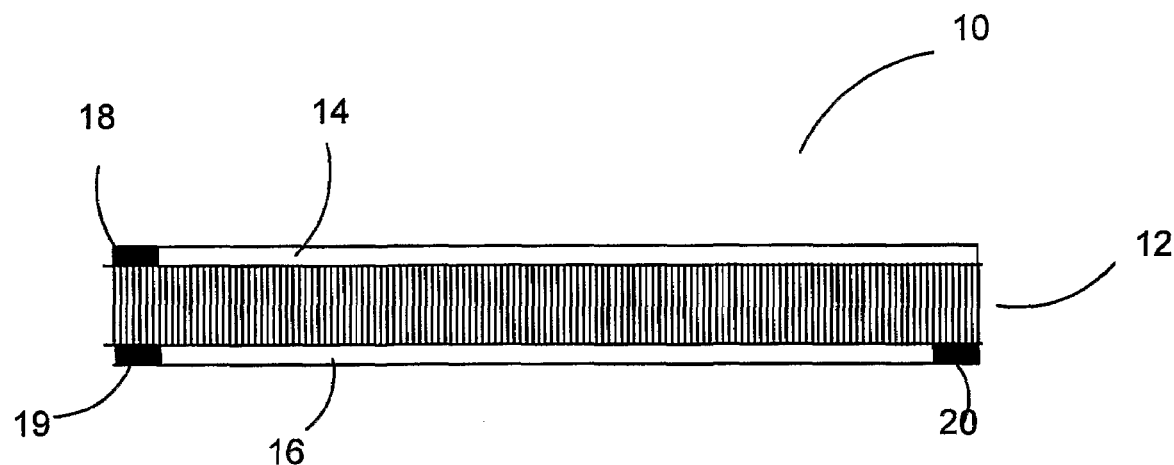

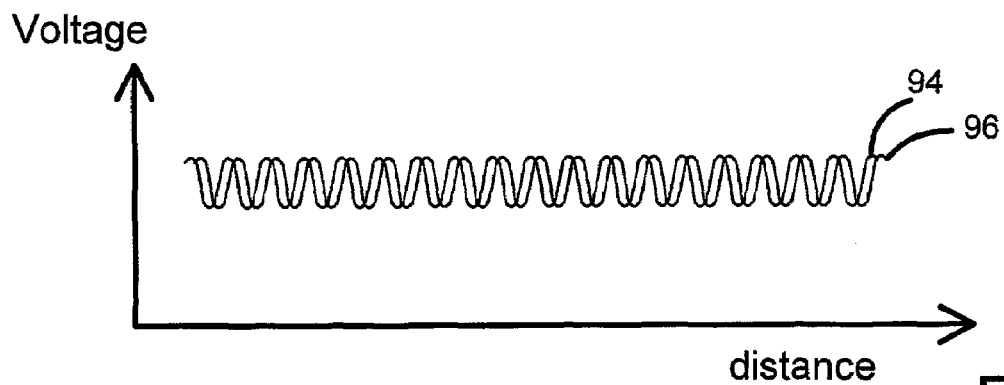
Fig 14
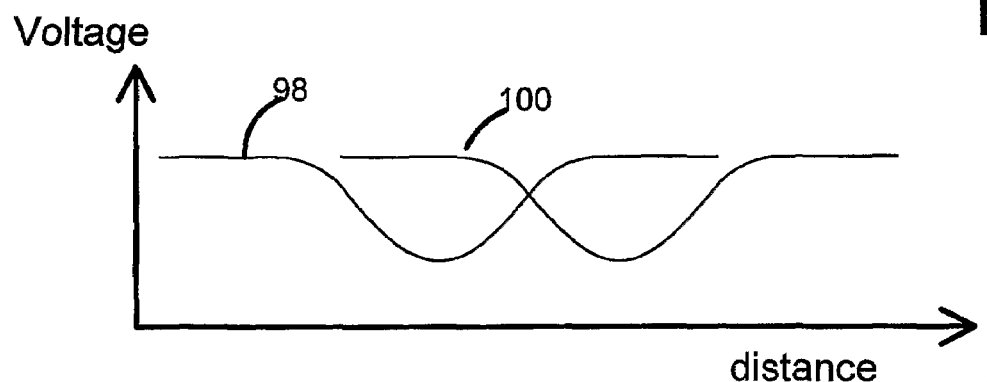
Fig 15
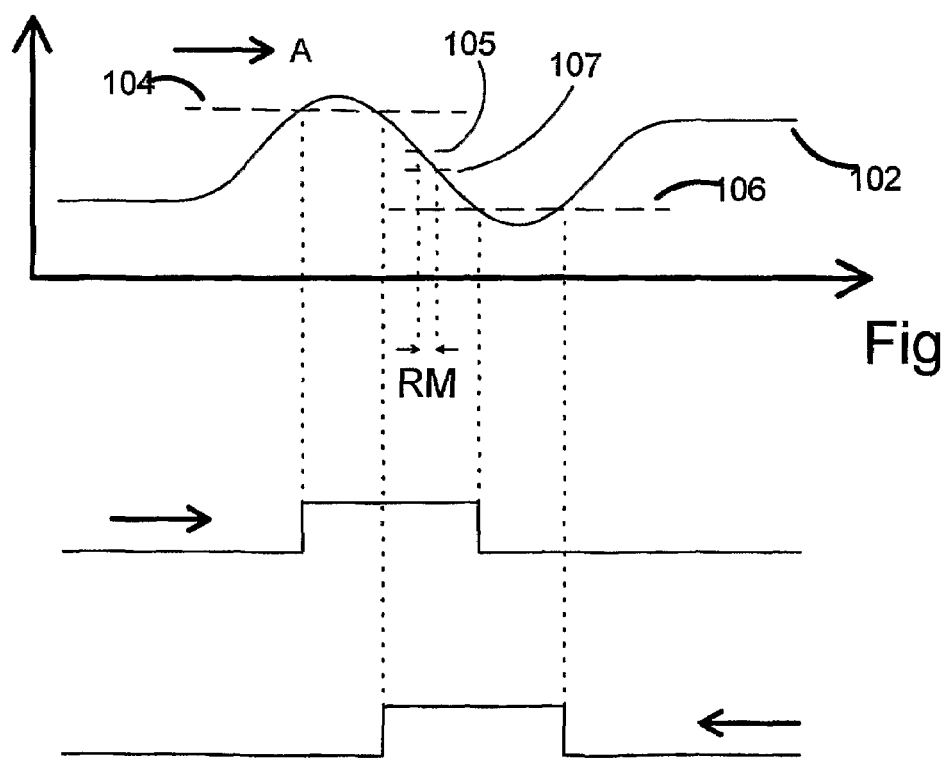
Fig 16
Fig 17

| MSB | | LSB |
|---|---|---|
| 1011001001000111 | 1001010110101110 | 1011110101 |
| No. of rotations | No. of lines | Interpolated data |

Fig 20

| 0000000000000000 | 0000000000000000 | 00000000000 |

Fig 21

| 0100100010010011 | 0100110100110101 | 01110110010 |

Fig 22

| 0100100010111111 | 010xxxxxxxxxxxxx | xxxxxxxxx 1 |

Fig 23

| 0100100010111111 | 0100110100110101 | 01110110010 |

Fig 24

| FUNCTION | OUTPUT 1 | OUTPUT 2 |
|---|---|---|
| LIMIT MARK | D1 AND D2 | D2 |
| INCREMENTAL | D1 | D2 |

Fig 25

SCALE READING APPARATUS

The present invention relates to scale reading apparatus, comprising a scale and a readhead mounted on first and second members to thereby measure relative movement of the first and second members. In particular, the invention relates to incremental scale reading apparatus.

A known form of scale reading apparatus for measuring relative displacement of two members comprises a scale on one of the members having scale marks defining a pattern and a readhead provided on the other member.

An incremental scale reading apparatus is a device for measuring the relative position of two objects. Typically a scale is attached to one of the objects and a readhead to the other, the scale having regularly spaced identical markings on it. The readhead projects light onto the scale which, depending on the configuration of the scale, is then either reflected or transmitted. From the reflected or transmitted light, the readhead generates a series of signals which may be used to generate an incremental count indicative of the relative displacement of the two objects. Our earlier European Patent No. 207121 describes an incremental scale reading system.

Scale reading apparatus are suitable for use with linear, rotary scales and two-dimensional scales.

Different applications of the scale reading apparatus will require different scale pitches. If accurate positioning is required, then a fine pitched incremental scale is suitable. For example an accurate low speed (e.g. 0-500 rpm) rotary table requiring positional feedback.

However, for measuring high speed, low accuracy positioning is sufficient and a coarse pitched incremental scale is suitable. For example a machine tool having a high speed (e.g. 10,000-30,000 rpm) rotary spindle would require a coarse pitch incremental rotary scale to provide velocity feedback.

More versatile equipment may have combined functions. For example a machine tool may be used as a high speed rotary spindle that can be used to turn parts and which can then be slowed down and used as an accurate low speed rotary table.

For example, equipment requiring a maximum turning speed of 30,000 rpm for a high speed function and an angular resolution of 0.5 arcsec for a low speed positioning function would require a bandwidth of 1.296 GHz. As incremental output scale reading systems typically have bandwidths limited to approximately 30 MHz, it can be seen that a single detector system providing a solution to the problem would require a prohibitively high system bandwidth.

Traditional scale reading apparatus have either been high speed, coarse pitch systems with poor positioning accuracies or low speed, fine pitch systems.

A first aspect of the invention provides a scale reading apparatus comprising:

a scale and readhead moveable relative to one another, said scale having scale markings arranged to form a first incremental pattern having a first scale pitch and at least one scale marking arranged to form a second incremental pattern having a second scale pitch, different to said first scale pitch;

first detecting means to detect said first incremental scale pattern;

second detecting means to detect said second incremental pattern;

wherein both first and second detector means are provided in the same readhead.

The scale markings of said first incremental pattern may be located in a first scale track and said at least one scale marking of said second incremental pattern may be located in said second scale track. The at least one scale markings of said second incremental pattern may also provided in a third scale track. The arrangement of the scale markings in said second and third scale tracks and their associated detecting means may be such that the output signals from said detecting means are in quadrature. Alternatively, the scale markings of said first incremental pattern and the scale markings of said second incremental pattern may be located in the same scale track.

The scale may comprise a linear, two dimensional or rotary scale. In a rotary scale, the at least one scale marking of the second incremental pattern may comprise one scale marking resulting in one marking per revolution.

The first pitch may be smaller than the second pitch.

The scale reading apparatus may include a comparator to compare the speed of relative motion between the scale and readhead or a property of the system related to said speed to a threshold and thereby select the output from one of the first and second detecting means appropriate to said speed to determine the relative position of the scale and readhead. The comparator may compare the speed of relative motion between the scale and readhead to a threshold and wherein if the speed is above the threshold, the output from the second detecting means is used to determine the relative position of the scale and readhead. The comparator may compare the speed of relative motion between the scale and readhead to a threshold and wherein if the speed is below the threshold, the output from the first detecting means is used to determine the relative position of the scale and readhead.

The scale may include at least one reference mark. The at least one reference mark may comprise a scale marking in said second pattern.

A second aspect of the present invention provides a method for detecting the relative position or speed of a scale and readhead of a scale reading apparatus comprising a scale, said scale having scale markings arranged in a first incremental pattern having a first scale pitch and at least one scale marking arranged in a second incremental pattern having a second scale pitch, said first scale pitch being different to said first scale pitch, and a readhead comprising first detecting means to detect said first incremental scale pattern and second detecting means to detect said second incremental pattern, the method comprising the steps of:

outputting signals from the first and second detector means;

The method may include the step of outputting a signal which indicates the validity of the first and second signals. The method may include the step of comparing the speed of relative motion between the scale and readhead or a property of the system related to said speed to a threshold and thereby selecting the output from one of the first and second detecting means appropriate to said speed to determine the relative position of the scale and readhead. If the relative speed of the scale and readhead is above said threshold, the output from the second detecting means may be used. If the relative speed of the scale and readhead is below said threshold, the output from the first detecting means may be used.

The first pitch may be less than the second pitch.

A reference mark may be provided and the method may include the step of using the reference mark to identify the position of the readhead with respect to the scale before returning to output of the first detector from the output of the second detector.

A third aspect of the present invention provides a scale reading system comprising a scale and readhead moveable relative to each other;

and a communications link outputting data from the readhead;

wherein data of two different resolution levels is sent down the same communications link.

The data may be sent down the communication link as a words comprising series of data bits. One or more bits may indicate the resolution level of a word.

At high resolution, a first portion of the data bits in the word may be valid. The first portion may comprise all the data bits. At low resolution, a second portion of the data bits in the word may be valid. The first and second portions may be at any position in the word and may overlap.

The data may relate to the relative position of the scale and readhead.

A fourth aspect of the present invention provides a scale reading apparatus comprising:

a scale having at least one track, wherein the track comprises at least one scale marking;

a readhead with a transducer system to detect the at least one scale marking and to produce signals relating to the at least one scale marking; and configuring means, which selects the signal decoding method to produce an output from the signal relating to the chosen function of the scale The configuring means may act on the signal to produce an output relating to one of an incremental function or at least one alternative function. The at least one alternative function comprises a limit mark function. The at least one alternative function may comprise a reference mark function. The at least one alternative function may comprise an absolute scale function.

The configuring means may be located on the readhead. For example, the configuring means may comprise a switch or pins located on the readhead. The configuring means may be located externally form the readhead. For example, the configuring means may be provided by software.

Preferably the transducer system detects individual scale markings of the at least one scale marking in the at least one track.

In one embodiment, the scale is provided with a fine incremental scale track and the readhead is provided with a fine incremental transducer system to detect relative motion between the fine incremental scale track and the readhead. The at least one scale marking in the at least one track may be arranged to form an incremental scale and the configuring means configured to produce an incremental output, wherein the pitch of the scale markings in the at least one track is larger than the pitch of scale marks in the fine incremental scale track.

The apparatus may include a comparator to compare the speed of relative motion between the scale and readhead or a property of the system related to said speed to a threshold to a threshold and thereby select the output from one of the at least one track transducer system and fine pitch incremental transducer appropriate to said speed. At least one reference mark may be provided and wherein on returning to the output from the fine incremental transducer, a reference mark is used to verify the position of the scale relative of the readhead.

Figure 2:
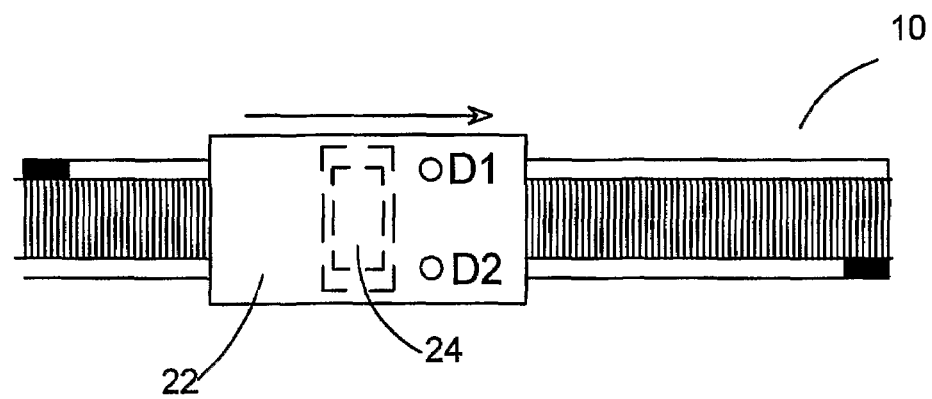
Figure 3:
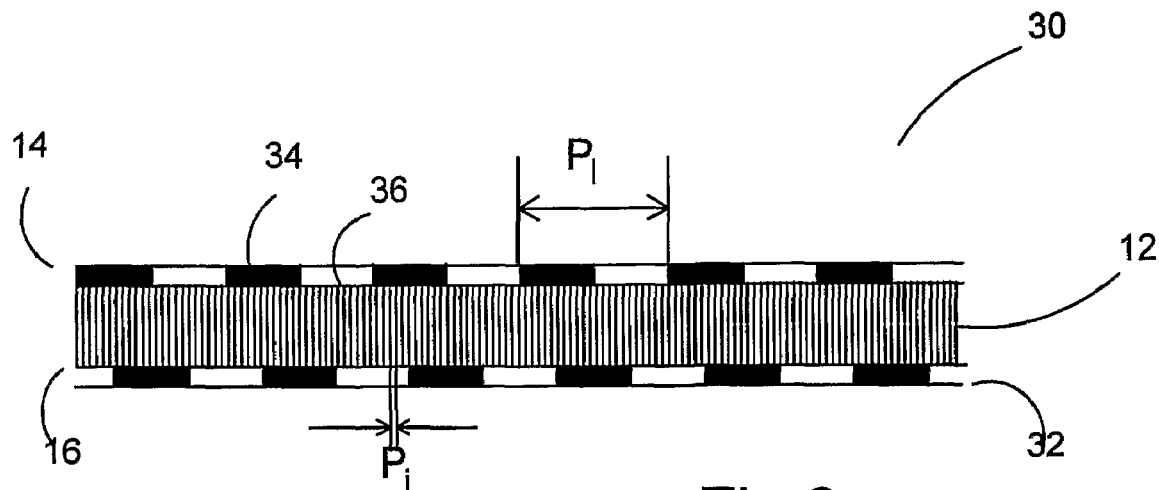
Figure 4:
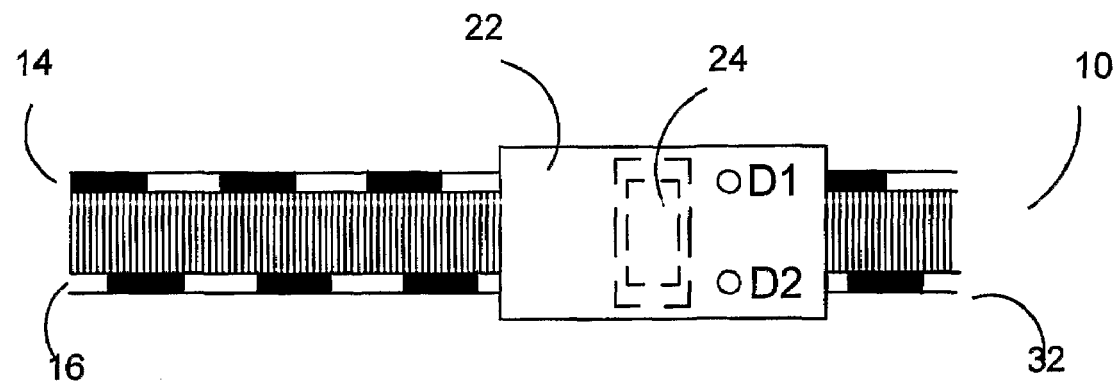
Figure 5:
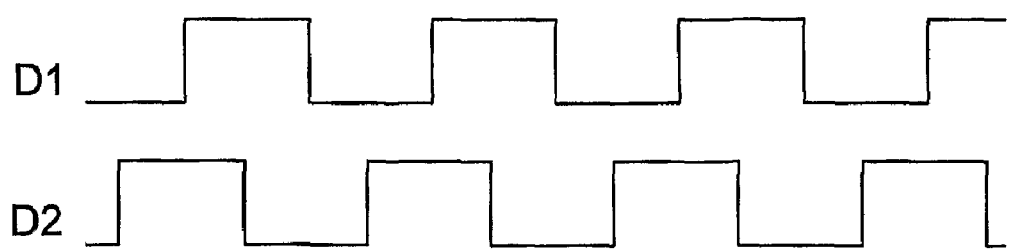
Figure 6:
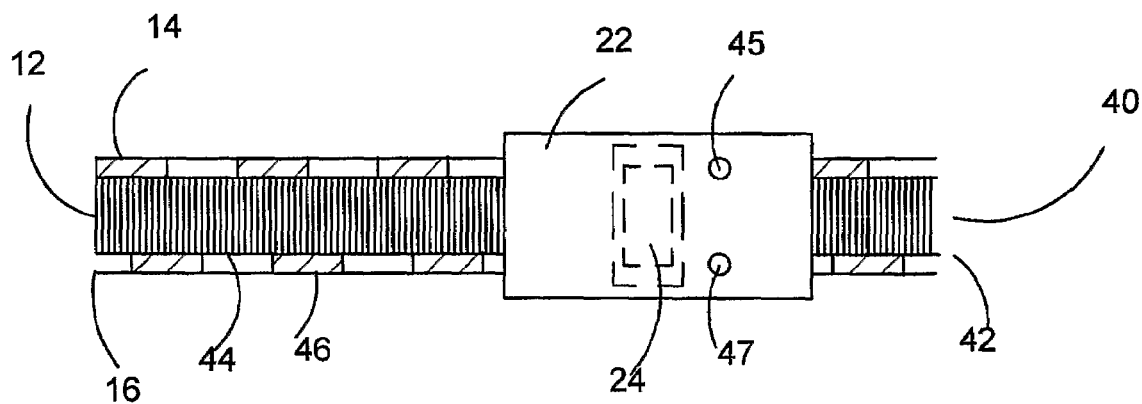
Figure 7:
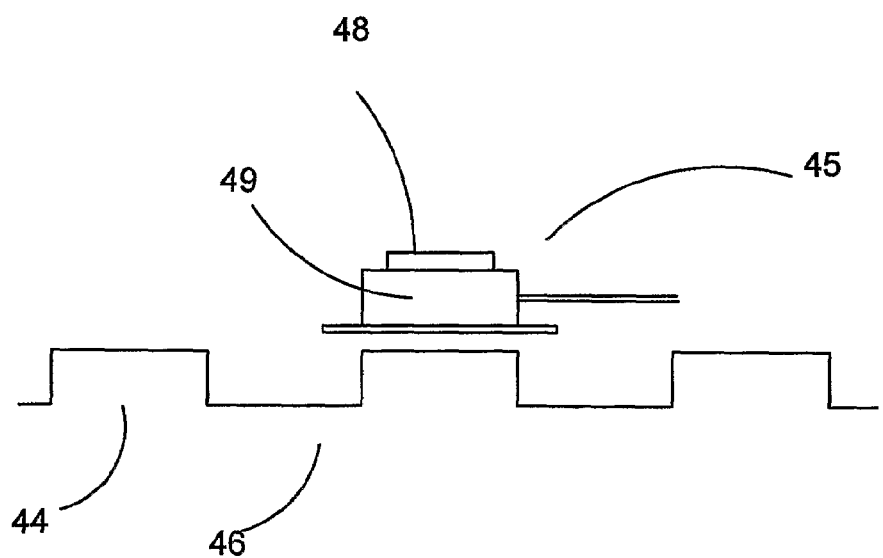
Figure 8:
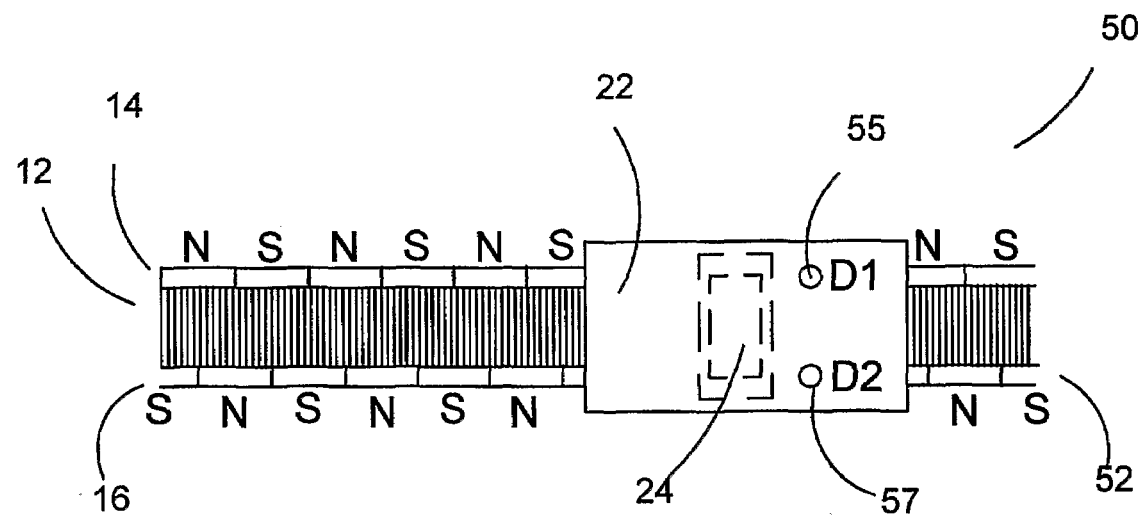
Figure 9:
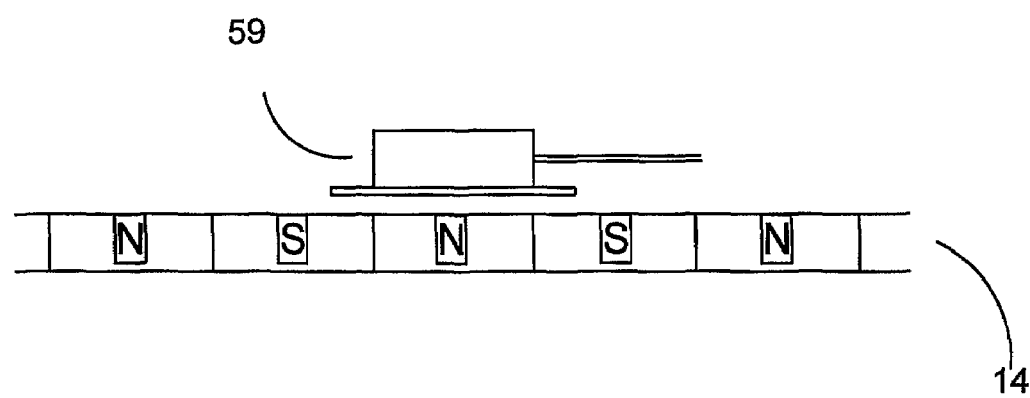
Figure 10:
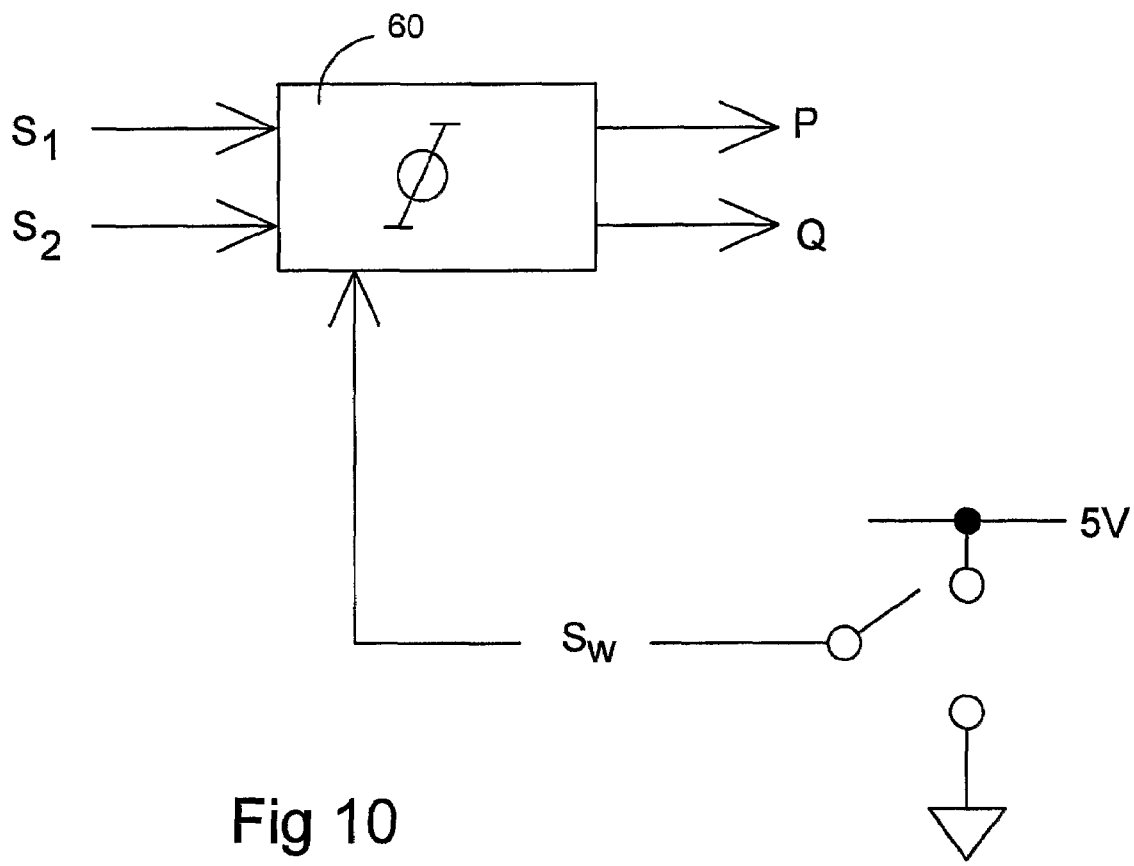
Figure 11:
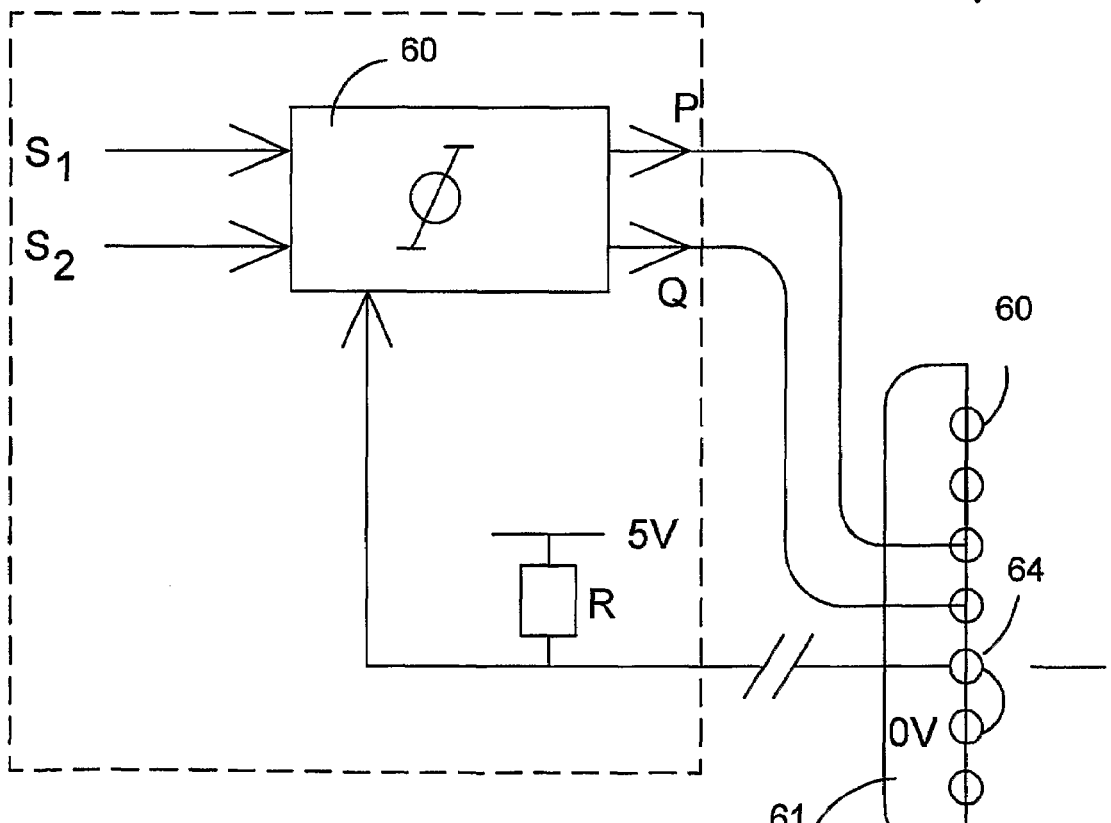
Figure 12:
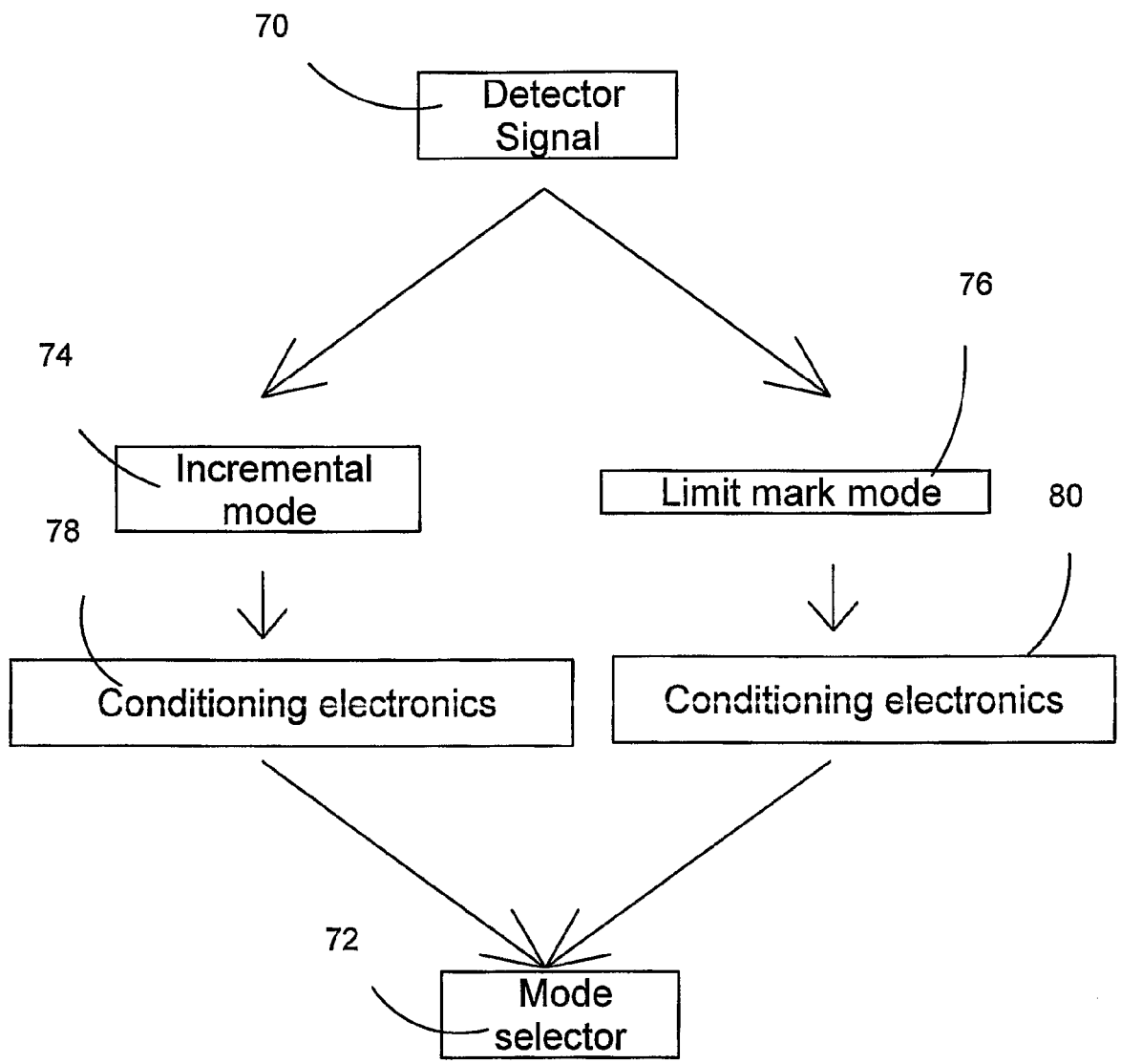
Figure 13:
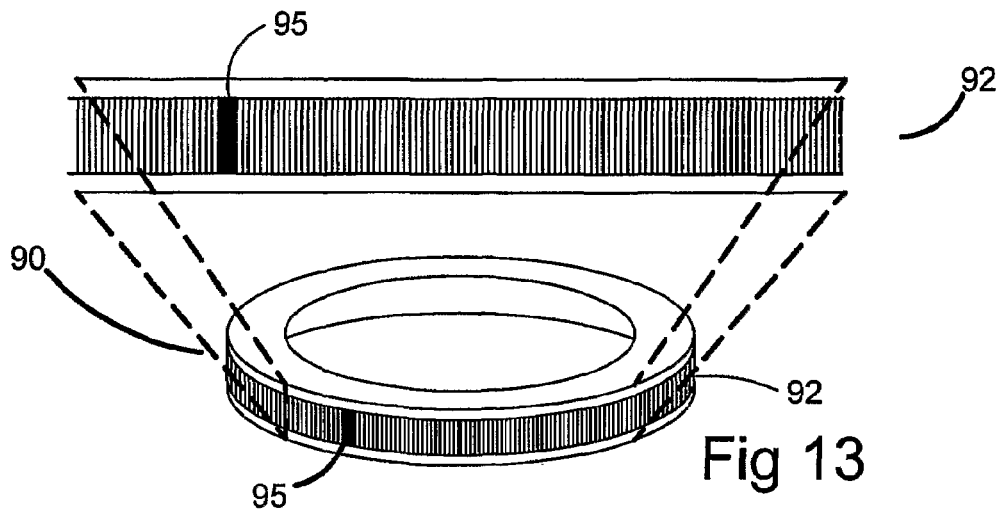
Figure 18:
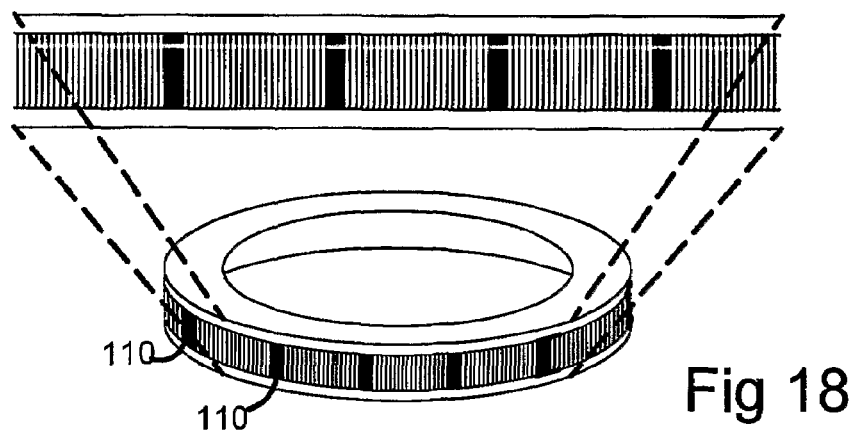
Figure 19:
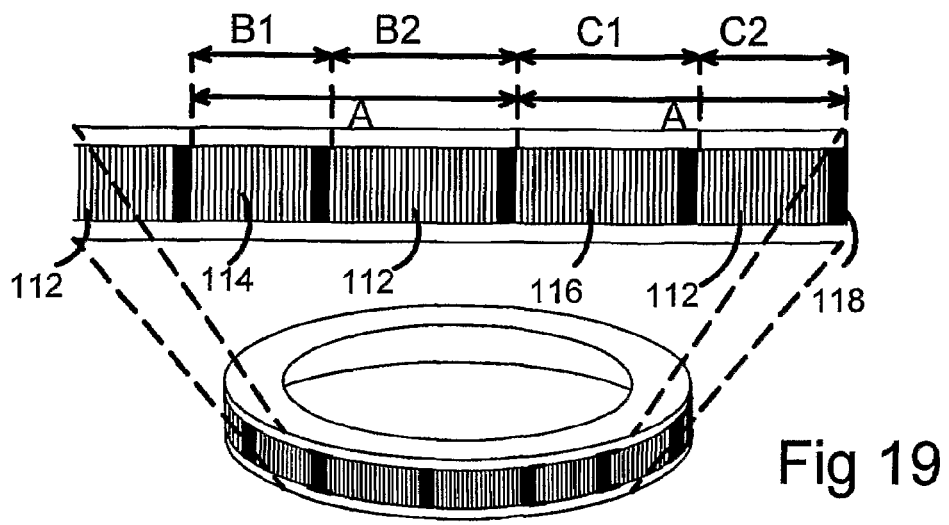

Preferred embodiments of the present invention will be illustrated by way of example with reference to the accompanying drawings, wherein:

FIG. 1 is a plan view of a prior art scale;
FIG. 2 is a plan view of a prior art scale and readhead;
FIG. 3 is a plan view of a scale according to a first embodiment of the invention;
FIG. 4 is a plan view of a scale and readhead according to a first embodiment of the invention;
FIG. 5 illustrates the output of the limit track detectors of the first embodiment of the invention;
FIG. 6 is a plan view of a scale and readhead of a second embodiment of the invention;
FIG. 7 is a cross section of the readhead of FIG. 6, along the limit track;
FIG. 8 is a plan view of a scale and readhead of a third embodiment of the invention;
FIG. 9 is a cross section of the readhead of FIG. 7, along the limit track;
FIG. 10 is a schematic illustration of a switch configuration means;
FIG. 11 is a schematic illustration of a pin configuration means;
FIG. 12 is a flow diagram illustrating the signals from the transducers being converted into outputs;
FIG. 13 illustrates a rotary scale with a single reference mark;
FIG. 14 illustrates a rotary scale with multiple evenly spaced reference marks;
FIG. 15 illustrates a rotary scale with multiple reference marks spaced according to a distance coding algorithm;
FIG. 16 is a signal from the fine incremental scale track;
FIG. 17 illustrates an output from a reference mark detector;
FIG. 18 illustrates an unprocessed reference mark from the output of the reference mark detector;
FIG. 19 illustrates the simple processing of the reference mark signal from FIG. 17;
FIG. 20 is a schematic illustration of a 42 bit position word;
FIG. 21 illustrates the 42 bit position word of FIG. 20 at power-on;
FIG. 22 illustrates the 42 bit position word of FIG. 20 at low speed;
FIG. 23 illustrates the 42 bit position word of FIG. 20 at high speed;
FIG. 24 illustrates the 42 bit position word of FIG. 20 on returning to low speed; and
FIG. 25 is a table illustrating the different functions of the scale.

A known scale reading system is shown in FIGS. 1 and 2. FIG. 1 shows the scale 10 which comprises a fine incremental track 12 and a pair of limit tracks 14,16. The fine incremental track 12 comprises alternate reflecting and non reflecting lines, having a pitch of for example 20 µm. (Other types of incremental scale may be used, for example phase scale). The limit tracks 14,16 are located on either side of the incremental track 12 and have reflective limit marks 18,19,20 on a non reflective background which indicate the two end limits of the scale. The left limit is indicated by a limit mark 18,19 in each track 14,16 and the right limit is indicated by a limit mark 20 in one limit track 16.

FIG. 2 shows the readhead 22 mounted onto the scale 10. Incremental optics 24 are provided to detect the incremental scale in the fine incremental scale track. These may comprise, for example, a light source, a grating and detector as discloses in EP 207121. The output of the detector is used to produce an incremental count as the readhead 22 moves relative to the scale 10. The readhead 22 may provide some electronic interpolation such that the resolution is higher than would be achieved by direct counting of the markings on the scale. In some cases the outputs are analogue (often two sinusoidal in quadrature) to allow electronics external to the readhead to perform the interpolation.

Any type of scale which produces a sinusoidal output at the detector plane may be used in the fine incremental track, for example a phase scale which comprises alternating sections of the scale having different depths.

Detectors D1 and D2 detect the reflective limit marks 18,20 in the limit tracks 14,16 and thus detect when the readhead 20 is at either end of the scale 10.

FIG. 3 illustrates a scale according to a first embodiment of the invention. This scale 30 also comprises a fine incremental track 12 and two limits tracks 14,16. However, the limit marks in the limit tracks have been replaced by a coarse incremental scale 32, made up of alternating reflective 34 and non reflective 36 marks. The pitch $P_l$ of the coarse incremental scale in the limit tracks 14,16 is much larger than the pitch $P_i$ in the fine incremental track 12. For example, the pitch of the fine incremental scale in the fine incremental track could be 20 μm and the pitch of the coarse incremental scale in the limit tracks could be 200 μm.

FIG. 4 illustrates a plan view as seen through the readhead 22 positioned over the scale 30. Incremental optics 24 are used to read the fine incremental scale track 12. The coarse incremental scale 32 in the limit tracks 14, 16 are read by the limit track detectors D1 and D2. FIG. 5 illustrates the outputs from detectors D1 and D2 when it passes over the coarse scale in the limit tracks 14,16. The signals from D1 and D2 are, in this example, output low when over a non-reflective portion of scale, and high when over a reflective portion of scale.

As illustrated in FIGS. 3 and 4, the coarse incremental scale pattern in limit track 16 is offset by quarter of a pitch from the coarse incremental scale pattern in limit track 14 so that the output from the detectors D1 and D2 are in quadrature, as shown in FIG. 5. (Although they can be offset by greater than 90 degrees). This allows the direction of the readhead relative to the scale to be determined. However, if direction was not required, only one coarse incremental scale would be required. Furthermore, the direction is already known from the fine incremental scale output as in order to change direction, the system must travel at a slow velocity, during which the fine incremental scale can be read. Alternatively, two detectors could be provided in a single scale track, the two detectors being offset by at least quarter of a pitch. This would allow a pair of quadrature signals to be produced using a single track. This arrangement of detectors side by side over a single track is suitable for all the following embodiments.

Although the figures illustrate reflective scale for both the incremental and limit tracks, transmissive scales may also be used for any of the embodiments.

Different types of markings may be used for the markings in the limit track, as long as the detector detects two different states for the different markings. For example, the markings may be non reflective on a reflective background. Alternatively, the non reflective section may be replaced by a marking which directs the light in a direction away from the detector, such as a prism or a chamfered and polished surface.

The marks in the limit track and the associated detectors do not need to be optical. Other methods may be used to generate the signals from the limit tracks, for example magnetic, capacitive and inductive sensors may be used to generate quadrature in a similar way.

A second embodiment of the invention will now be described with reference to FIGS. 6-7. FIG. 6 illustrates the scale 40 which as before comprises a fine incremental track 12 and two limit tracks 14,16. As before, incremental optics 24 are used to read the fine incremental scale track. However, in this system, the coarse incremental scale 42 in the limit tracks 14,16 is read by magnetic detectors 45,47. In this embodiment the scale is ferro-magnetic and the coarse incremental scale 42 has alternate sections 44,46 of different depth. FIG. 7 shows a cross section of the limit track 14. The alternate sections 44,46 of different depth make up a coarse incremental scale 42. The limit track detector 45 comprises a bias magnet 48 and a Hall sensor 49 and detects the change in magnetic field caused by the change of depth in the limit track.

As before, the outputs from detectors 45 and 47 are two signals in quadrature. The output signals from detectors 45 and 47 are, in this example, output low when over a "deep" portion of the limit track, and high when over a "shallow" portion of the limit track.

A third embodiment of the invention will now be described with reference to FIGS. 8 and 9. In this embodiment, the coarse incremental scale 52 is created in the limit tracks 14,16 by alternating 'North' N portions and 'South' S portions. The limit tracks 14,16 are read by magnetic detectors 55,57 in the readhead 22.

FIG. 9 illustrates a cross section of the limit track 14 and the readhead. The alternating 'North' N and 'South' S portions on the limit track 14 are detected by the Hall sensor 59 in the read head 22.

As before, the detectors 55 and 57 produce two signals in quadrature. The output signals from detectors 55 and 57 are, in this example, output low when over 'North' portion of the limit track, and high when over a 'South' portion of the limit track.

Outputs from both the fine incremental track optics and the limit track optics are sent to a controller. The relative speed of the scale and readhead are compared with a threshold in a comparator. The output from the fine incremental scale track can only be used up to a threshold value of relative speed between the scale and readhead. Whilst the relative speed between the scale and readhead is below the threshold, the user can use the output from either the fine incremental scale or the course incremental scale in the limit track. For accurate positioning, for example, the user may choose to use the output from the fine pitch incremental scale as this will give the most accurate reading. If the relative speed between the scale and readhead is above the threshold at which the output from the fine incremental track can be used, the output from the coarse incremental scale in the limit tracks will be used.

Instead of comparing the relative speed of scale and readhead to a threshold, properties of the system related to the speed may be compared to a threshold. For example the amplitude of signals outputted from the detectors may be compared to a threshold. When the speed reaches a certain limit the amplitude of the fine incremental track transducer will drop below the threshold. An automatic gain control (AGC) may be used to keep the signal amplitude constant. In this case the AGC demand for the fine incremental detecting signal will increase as the speed increases beyond a certain level. Thus this AGC demand value may be compared with a threshold.

A reference mark may be provided to provide a reference position against which the incremental counter is set. When the system speed drops below the threshold such that fine positioning is possible, it may be advantageous to pass the readhead over the reference mark to determine an absolute position. Alternatively, a more accurate position may be determined by interpolation of the course scale in the limit tracks.

This system has the advantage that a single readhead and scale system acts as both a high speed system and a fine pitch accurate system.

Furthermore, the invention has the advantage that as the coarse incremental scales are located within the limit tracks, the same readhead may be used to detect a scale with limit marks in the limit tracks or a scale with coarse incremental scales in the limit tracks.

The same detectors in the readhead are used to detect the features in the limit track, whatever their function, i.e. limit marks or incremental scale. The outputs from these detectors are configured so that the signal relates to the correct function of the limit track, e.g. limit marks or coarse incremental scale.

FIG. 25 is a table illustrating how the system is configured for two different functions, a limit track function and an incremental function. For the limit track arrangement illustrated in FIG. 1, output 1 (left limit) requires a signal from both detectors D1 and D2 and output 2 (right limit) requires a signal from detector D2 only. For the incremental arrangement illustrated in FIGS. 3 and 4, output 1 requires a signal from detector D1 and output 2 requires a signal from detector D2. These outputs are combined to produce quadrature as illustrated in FIG. 5.

The outputs of the limit track detectors may be configured by providing a switch in the readhead. FIG. 10 illustrates the logic circuit used to process the output signals. Output signals S1 and S2 from the limit track detectors are input into the logic circuit 60. A switch $S_w$ provides either a high or low input to the logic circuit 60. When the switch $S_w$ provides a high output, the outputs P and Q are limit switch outputs and when the switch $S_w$ provides a low output, the outputs P and Q are quadrature incremental outputs.

The outputs of the limit track detectors may be configured by providing pins for the different functions as illustrated in FIG. 11. In FIG. 11, a logic circuit 60 is provided as in FIG. 101 with the same reference numbers being provided for the same parts. The readhead connection 61 is provided with a set of pins 62 and by pulling the relevant pin 64 to a high or low position, the limit track detector output can be configured to decode the limit track as an incremental scale or a limit mark.

In the systems illustrated in FIGS. 10 and 11, the output is sent from the same readhead pins, whether it relates to an incremental or limit switch signal, but the function of the pins is changed. In this case, the user chooses a scale for the desired function, and sets the readhead switch or pins accordingly.

The configuration of the detector outputs may also be done in software memory.

Rather than configuring the detector output at the readhead, the readhead may output signals relating to both the incremental function and the limit function simultaneously and the correct function may be chosen by the user at the controller.

FIG. 12 illustrates the transducer signals being converted to outputs suitable for the function of the scale. The detector signal 70 from the limit track detector is decoded differently depending on the state of the mode selector 72, which may for example comprise the switch, pins or software described above. If the incremental mode is selected 74, the signal is passed through decoding electronics 78 to produce an incremental output. If the limit mark mode is selected 76, the signal is passed though conditioning electronics 80 to produce a limit mark output. The outputs may, for example, be a digital quadrature output or an open collector output.

In order to enable the limit track to have multiple functions, i.e. providing limit switches or a coarse incremental scale, the limit switch detectors must be able to detect marks individually.

The invention is not restricted to the dual function of limit tracks as described above. For example, the readhead may be configured to read scale markings as either a reference mark or a coarse incremental scale, (as described in more detail below) or the readhead may also be configured to read scale markings as either an absolute scale or incremental scale.

In an alternative set of embodiments, a reference mark may be used to produce an incremental signal at high speed.

FIG. 13 illustrates a rotary scale 90 which comprises an incremental scale track 92, typically comprising a repeating pattern of reflective and non reflective lines with a pitch of, for example 20 μm. (Other types of incremental scale may be used, for example a phase scale).

A reference mark 95 is provided in the incremental scale track 92. This reference mark has a length (along the scale) which is significantly larger than the pitch of the incremental track. It may, for example have a length of 200 μm and typically comprises a reflective or non reflective strip.

The readhead (not shown) is provided with incremental optics which produce a signal from the incremental scale which comprises two sinusoidal signals in quadrature, as illustrated in FIG. 14. An up or down count may be produced from these signals.

The readhead also comprises reference mark optics, for example a split detector, which enables the reference mark to be detected. FIG. 15 illustrates signals 98,100 which are the outputs from the split detector. The difference between split detector signals 98,100 are taken to produce signal 102 illustrated in FIG. 16. This signal 102 can be processed to produce a 20 μm reference mark signal. A pair of outer thresholds 104,106 are used to indicate that the readhead is approaching a reference mark. A pair of inner thresholds 105,107 are used to define the reference mark. Thus when the readhead moves in the direction of arrow A, it will indicate that it is approaching a reference mark when the signal 102 passes over threshold 104. When the signal 102 passes between thresholds 105 and 107, it will output a reference mark indication. As inner thresholds 105 and 107 are close together and the signal 102 between them has a steep gradient, a narrow reference mark signal can be achieved. Alternative optical schemes for detecting large reference marks are also possible.

The unprocessed reference mark feature may also be used to provide an incremental output which is suitable for use at high speeds. The reference mark is significantly larger than the pitch of the incremental scale and at high speeds the signal output for the reference mark will change at A lower rate than the signal output for the fine incremental track. As the system bandwidth is approximately the same for both the fine incremental track and reference mark, the reference mark can be operated at much higher speeds before the signal is attenuated. In this example, the reference mark can be seen at up to ten times higher velocities than the incremental output can be used.

The unprocessed reference mark signal 102 illustrated in FIG. 16 may be used directly by the user to produce a coarse incremental output at high speed. Alternatively, simple processing may be done, for example by using two thresholds (shown by dashed lines 104,106) to set and reset a flip-flop, thus resulting in the output illustrated in FIG. 17. This example uses the same thresholds 104,106 as the outer thresholds used to indicate the reference mark. However different thresholds may be used if required. This processing does not rely on the presence of the incremental channel, thus this coarse incremental output can be used at velocities when the fine incremental scale can no longer be read. Other processing schemes may be used.

The rotary scale illustrated in FIG. 13 has a single reference mark and will thus give an output of one pulse per revolution.

The scale and readhead system may be configured as a dual output system so that the reference mark is processed in its normal way to provide a reference position to be used with the fine incremental signal at low speed and also in its simply processed form to give one pulse per revolution for use at high speeds.

FIG. 18 illustrates a variation of the embodiment illustrated in FIG. 13. In this embodiment, the rotary scale is provided with an incremental scale track as before, with multiple evenly spaced reference marks 110. This enables multiple pulses to be generated per revolution at high speeds. However, as there are multiple reference marks, a reference mark selector may be used to indicate which of the multiple marks is to be used as a unique reference mark to indicate a unique position within each revolution. The reference mark selector could itself serve this purpose.

FIG. 19 illustrates another variation. This embodiment also has multiple reference marks to enable more pulses to be generated per revolution. In this embodiment, the marks are spaced in the fashion of a typical 'distance coded' encoder. Alternate marks 112 are equally spaced (by distance A) and the intervening marks 114,116,118 are spaced at varying positions between their adjacent marks 110 (at distances B1,B2,C1,C2 etc) to give a unique position when two adjacent marks are read. This embodiment has an advantage over the embodiment illustrated in FIG. 18 in that an individual reference mark does not need to be selected by a marker by the end user. Different distance coding schemes are possible. However, the more evenly spaced the reference marks, the less error caused by the variation in reference mark spacing will be seen. This errors cause a 'velocity ripple' effect which is seen at constant velocity.

Although the embodiments illustrated in FIGS. 13,18,19 illustrate an optical reference mark embedded in the incremental scale, the reference mark may be non optical, for example magnetic, capacitive or inductive. Additionally, the incremental scale track may be non optical. The reference mark may be in a separate scale track parallel to the incremental scale track, rather than embedded. Any suitable detection system may be used.

The scale and readhead may be either reflective or transmissive. This system is also suitable for linear and two-dimensional scales.

In the embodiments described above, the high speed and low speed outputs may be produced on either two separate outputs or on a single output which can be switched or configured between the two modes. Such a system relies on using a controller or drive with two inputs or a control line to switch the encoder system between resolutions.

It is advantageous to have just one data output for the incremental signal at both high and low speeds. However, as previously described, the output frequency for high speed measurement using a single incremental scale is prohibitively high for digital quadrature systems.

A serial communications protocol enables a single output to be used for the dual incremental system. In this system the readhead position is stored within the readhead using a counter and sent out to a controller only when requested. The readhead position count can be sent to the controller as a series of binary numbers streamed serially to the controller.

FIG. 20 illustrates an example of a 42 bit position word. (Although other sized words may be used). The most significant bit (MSB) is on the left hand side and the least significant bit (LSB) is on the right hand side. The first 16 bits relate to the number of rotations of the rotary scale, the second 16 bits relate to the number of lines in the incremental scale detected and the third 10 bits relate to the interpolated data. The whole word thus describes the angle of rotation and the number of rotations for the rotary scale.

If the rotary scale ring has a binary line count of, for example 65536 and a binary interpolation of, for example 1024, then for this example the top 16 bits are effectively the number of rotations.

At low speed, the output is sent from the fine incremental scale and all 42 bits are used. At high speed, the fine pitch incremental signal drops in signal amplitude so that lower bits corresponding to the number of lines and the interpolated data will no longer be valid. However the coarse pitch signal generated from the reference mark or limit tracks enables the higher bits, corresponding to the number of rotations to be updated. If more than one reference mark exists on the scale, more bits could be updated to give fractions of rotation.

When the rotation is of the scale is slowed below a threshold, the incremental data will become valid again. A reference mark selected by the user to show the number of rotations may be used to re-synchronise the lower bits.

FIG. 21 illustrates the data at power-on of the system. In this case, all the bits are set to zero. The last data bit indicates to the controller which bits are valid. In this example zero indicates that all the bits are valid and one indicates that the first 19 bits are valid.

The word may be synchronised after power up by passing the readhead over a reference mark. This may set the data bits in the word to zero. Alternatively the data bits may be set to zero at power up and the position of the reference mark recorded and the difference used to adjust subsequent measurements. One or more data bits may be used to indicate that synchronisation with a reference mark has taken place.

FIG. 22 illustrates the data at low speed. In this case the data is coming from the fine resolution incremental scale from which data of the number of rotations, number of scale lines and interpolated data from between scale lines can be determined. Thus the last data bit is a zero to indicate that all the bits are valid.

FIG. 23 illustrates the data at high speed. For a rotary scale having a single reference mark, just the number of rotations may be determined. Where a scale has multiple reference marks, then data bits relating to the number of lines may be determined. In this example, the first 19 bits are valid. Unknown data is shown by an 'x'. This could comprise the frozen last reading or all the data bits could be set to 0 or 1.

FIG. 24 illustrates the data when the velocity has dropped below a threshold at which the fine incremental scale data is valid. On deceleration the data will only be valid after re-synchronisation with a reference mark. If the ring has distance coded reference marks, then this re-synchronisation step will happen quickly. However, as the rotary scale is rotating at high speed, this reduction in time may be negligible.

The invention claimed is:

1. Scale reading apparatus comprising:
   a scale and readhead moveable relative to one another, said scale having scale markings arranged to form a first incremental pattern having a first scale pitch and at least one scale marking arranged to form a second incremental pattern having a second scale pitch, different to said first scale pitch;
   a first detector to detect said first incremental scale pattern;
   a second detector to detect said second incremental scale pattern;
   wherein both first and second detectors are provided in the same readhead; and
   the output of at least one of the first and second detectors may be selected to provide incremental position information.

2. Scale reading apparatus according to claim 1 wherein scale markings of said first incremental pattern are in a first scale track and said at least one scale marking of said second incremental pattern is in said second scale track.

3. Scale reading apparatus according to claim 2 wherein said at least one scale marking of said second incremental pattern is also provided in a third scale track.

4. Scale reading apparatus according to claim 3 wherein the arrangement of the scale markings in said second and third scale tracks and their associated detectors are such that the output signals from said detectors are in quadrature.

5. Scale reading apparatus according to claim 1 wherein the scale markings of said first incremental pattern and the at least one scale marking of said second incremental pattern are located in the same scale track.

6. Scale reading apparatus according to claim 1 wherein the scale is a rotary scale.

7. Scale reading apparatus according claim 6 wherein the at least one scale marking of the second incremental pattern compnses one scale marking resulting in one marking per revolution.

8. Scale reading apparatus according to claim 1 wherein the first pitch is smaller than the second pitch.

9. Scale reading apparatus according to claim 8 further including a comparator to compare the speed of relative motion between the scale and readhead or a property of the system related to said speed to a threshold and thereby select the output from one of the first and second detectors appropriate to said speed.

10. Scale reading apparatus according to claim 9 wherein the comparator compares the speed of relative motion between the scale and readhead to a threshold and wherein if the speed is above the threshold, the output from the second detector is used.

11. Scale reading apparatus according to claim 10 wherein the comparator compares the speed of relative motion between the scale and readhead to a threshold and wherein if the speed is below the threshold, the output from the first detecting means is used.

12. Scale reading apparatus according to claim 1, the scale including at least one reference mark.

13. Scale reading apparatus according to claim 12 wherein the at least one reference mark comprises a scale marking in said second pattern.

14. A method for detecting the relative position or speed of a scale and readhead of a scale reading apparatus comprising a scale, said scale having scale markings arranged in a first incremental pattern having a first scale pitch and at least one scale marking arranged in a second incremental pattern having a second scale pitch, said first scale pitch being different to said second scale pitch, and a readhead comprising a first detector to detect said first incremental scale pattern and a second detector to detect said second incremental pattern, the method comprising the steps of:

outputting signals from the first and second detectors; and selectively using the output of at least one of the first detector and the second detector to provide incremental position information.

15. A method according to claim 14 wherein the method includes the step of outputting a signal which indicates the validity of the first and second signals.

16. A method according to claim 14 wherein the method includes the step of comparing the speed of relative motion between the scale and readhead or a property of the system related to said speed to a threshold and thereby selecting the output from one of the first and second detecting means appropriate to said speed.

17. A method according to claim 16 wherein if the relative speed of the scale and readhead is above said threshold, the output from the second detector is used.

18. A method according to claim 16 wherein if the relative speed of the scale and readhead is below said threshold, the output from the first detector is used.

19. A method according to claim 14 wherein the first pitch is less than the second pitch.

20. A method according to claim 14 wherein a reference mark is provided and the method includes the step of using the reference mark to identify the position of the readhead with respect to the scale before returning to the output of the first detector from the output of the second detector.

21. A scale reading system comprising a scale and readhead moveable relative to each other and configured to determine relative data at at least two different incremental resolution levels;

and a communications link outputting data from the readhead;

wherein the position data at the at least two different incremental resolution levels is sent down the same communications link.

22. A scale reading system according to claim 21 wherein the data is sent down the communication link as a words comprising series of data bits.

23. A scale reading system according to claim 22 wherein one or more bits indicate the resolution level of a word.

24. A scale reading system according to claim 21 wherein at high resolution, a first portion of the data bits in the word are valid.

25. A scale reading system according to claim 24 wherein the first portion comprises all the data bits.

26. A scale reading system according to claim 21 wherein at low resolution, a second portion of the data bits in the word are valid.

27. A scale reading system according to claim 21 wherein the data relates to the relative position of the scale and readhead.

28. A scale reading apparatus comprising:

at least one scale marking;

a readhead with a transducer system to detect the at least one scale marking and to produce signals relating to the at least one scale marking; and a configurator which selects a signal decoding method to produce an output from the signal relating to one of an incremental function or at least one alternative function.

29. A scale reading apparatus according to claim 28 wherein the at least one alternative function comprises a limit mark function.

30. A scale reading apparatus according to claim 28 wherein the at least one alternative function comprises a reference mark function.

31. A scale reading apparatus according to claim 28 wherein the at least one alternative function comprises an absolute scale function.

32. A scale reading apparatus according to claim 28 wherein the configurator is located on the readhead.

33. A scale reading apparatus according to claim 32 wherein the configurator comprises a switch or pins located on the readhead.

34. A scale reading apparatus according to claim 28 wherein the configurator is located externally from the readhead.

35. A scale reading apparatus according to claim 34 wherein the configurator is provided by software.

36. A scale reading apparatus according to claim 28 wherein the transducer system detects individual scale markings of the at least one scale marking.

37. A scale reading apparatus according to claim 28 wherein the scale is provided with a fine incremental scale pattern and the readhead is provided with a fine incremental transducer system to detect relative motion between the fine incremental scale pattern and the readhead.

38. A scale reading apparatus according to claim 37 wherein the at least one scale marking is arranged to form an incremental scale and the configurator is configured to produce an incremental output, wherein the pitch of said at least one scale marking is larger than the pitch of scale marks in the fine incremental scale track.

39. A scale reading apparatus according to claim 37 wherein when the apparatus includes a comparator to compare the speed of relative motion between the scale and readhead or a property of the system related to said speed to a threshold to a threshold and thereby select the output from one of the at least one scale marking transducer system and fine pitch incremental transducer appropriate to said speed.

40. A scale reading apparatus according to claim 39, wherein at least one reference mark is provided and wherein on returning to the output from the fine incremental transducer, a reference mark is used to verify the position of the scale relative of the readhead.

* * * * *